(12) United States Patent
Cutler

(10) Patent No.: US 6,597,751 B1
(45) Date of Patent: Jul. 22, 2003

(54) METHOD OF DISPLAYING SIGNALS IN THE PRESENCE OF INTER SYMBOL INTERFERENCE

(75) Inventor: Robert T. Cutler, West Everett, WA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/510,490

(22) Filed: Feb. 23, 2000

(51) Int. Cl.[7] .............................. H03D 1/06; H03K 6/04; H04L 25/08
(52) U.S. Cl. ....................... 375/348; 375/316; 375/346; 348/21
(58) Field of Search ................................. 375/348, 346, 375/316–351

(56) References Cited

U.S. PATENT DOCUMENTS

| | | | | |
|---|---|---|---|---|
| 3,621,139 A | * | 11/1971 | Gibson .................... | 178/69 B |
| 5,408,503 A | * | 4/1995 | Kahlman ................... | 375/340 |
| 5,995,135 A | * | 11/1999 | Limberg ................... | 348/21 |

OTHER PUBLICATIONS

Pottie, Multilevel Codes Based on Partitioning, Jan. 1989, IEEE Transaction on Information Theory, vol. 35, No. 1.*

Lee, Matched Filter Bounds on q–ary QAM Symbol Error Probability for Diversity Receptions and Multipath Fading ISI Channels, Sep. 2000, IEEE 1th International Symposium on, vol. 1, pp. 577–583.*

* cited by examiner

*Primary Examiner*—Don N. Vo
*Assistant Examiner*—Qutub Ghulamali
(74) *Attorney, Agent, or Firm*—Robert T. Martin (57) ABSTRACT

Display of signals containing inter-symbol interference (ISI). An input signal is modeled as comprising an ideal signal plus ISI plus error. In a first embodiment of the invention, an error signal and an ideal signal are derived from the input signal. The ideal signal is combined with the error signal producing an ideal signal with errors. In a second embodiment of the invention, a first signal comprising the ideal signal plus ISI plus error is derived. A second signal comprising only ISI is derived, and subtracted from the first signal, producing a signal containing the ideal signal plus error.

22 Claims, 7 Drawing Sheets

Fig. 7

METHOD OF DISPLAYING SIGNALS IN THE PRESENCE OF INTER SYMBOL INTERFERENCE

BACKGROUND OF THE INVENTION

1. Field of the Invention

The present invention relates to methods of displaying signal quality in digital data transmission systems in which inter-symbol interference (ISI) is present and cannot be practically removed by passing the signal through a filter. More specifically, the present invention relates to the display of signal quality in PSK transmission systems having ISI, such as GSM-EDGE.

2. Art Background

In the development, deployment, and operation of signal transmission systems, instruments are needed which will display signal quality, and assist the operator in identifying problems in the system. This is particularly true of digital systems. In systems using Phase Shift Keying (PSK), data is encoded by varying carrier phase and magnitude. Commonly, PSK schemes are identified by the number of different phase angles used in transmission. A scheme such as 8-PSK uses 8 equally spaced carrier phase angles. Each of these individual phase angles is called a symbol, and the set of symbols taken together is called a constellation.

In an ideal PSK transmission and reception system, a graphical display of symbols in I-Q space would show a discrete set of points on a circle. In such a display, it is easy to observe transmitter problems such as gain imbalance, phase noise, or the presence of spurious tones. Such instruments are typically referred to as Error-Vector-Magnitude (EVM) instruments.

When transmitting symbol streams on the crowded radio spectrum, filters are commonly used to limit the bandwidth of the transmitted signal. A side effect of these filters is that in limiting or shaping signal bandwidth, the signal is distorted. The nature of the distortion depends on the particular sequence of symbols; in decoding a particular symbol, the signal representing that symbol is distorted by the effect of the filter on the symbol and the symbols which surround it. Because this distortion is symbol dependent, it is called inter-symbol interference (ISI). In many systems, ISI introduced by a transmit filter is removed by a receive filter. In other systems, ISI cannot be practically removed because the bandwidth of the signal is too narrow to allow for zero ISI conditions.

GSM (originally Groupe Spécial Mobile, now known as Global System for Mobile Communications) is such a digital system in world wide use. GSM-EDGE represents an extension of GSM technology which allows for increased data rates in the same spectrum by changing the modulation from GMS's constant envelope GMSK 8-PSK to a system using 3π/8 8-PSK with symbol rotation, using both phase and amplitude modulation, but using the same sets of GSM filters. While GSM-EDGE offers increased data rates, it also suffers from significant in increases inter-symbol interference, as the transmit filter was chosen to produce a spectrum similar to that produced by earlier 0.3 GMSK waveforms, without regard to its ISI properties.

This inter-symbol interference has the effect of making a raw constellation display very difficult to use as an indicator of signal quality. What is needed is a method of displaying signal quality in systems having inherent inter-symbol interference.

SUMMARY OF THE INVENTION

Signal quality in an input signal containing inter-symbol interference is displayed by modeling the signal as comprising an ideal signal component plus an ISI component plus an error component, and subtracting out the ISI, leaving the ideal signal plus the error. In a first embodiment, the signal component is recovered from the input signal through demodulation. The recovered bit sequence is used to generate a correction signal equal but opposite to the ISI. The correction signal is added to the input signal in a feedforward fashion, resulting in the input signal minus ISI, plus any residual errors. The signal with these residual errors is then displayed. In a second embodiment, the error signal is derived from the input signal, and combined with a regenerated ideal signal, producing the signal with error, without ISI.

BRIEF DESCRIPTION OF THE DRAWINGS

The present invention is described with respect to particular exemplary embodiments thereof and reference is made to the drawings in which.

FIG. A shows a typical EVM instrument as known to the art.

DETAILED DESCRIPTION

GSM (originally Groupe Spécial Mobile, now known as Global System for Mobile Communications) is a digital communications system in world wide use. GSM uses 0.3 GMSK modulation with transmit filters specified by an international standard to transmit signals including voice and data. These standards include ETSI GSM 05.04, 05.05, 11.10, and 11.21.

In the development and testing of these systems which use linear modulation such as ISI-136 (π/4 DQPSK) and EDGE, instruments are needed for testing, verification, and diagnosis. Such instruments are typically referred to as Error-Vector-Magnitude (EVM) instruments, and provide graphical display of signals, including other measurements.

In most digital communications systems, bandwidth limitations require the use of filters in the transmitter. These filters operate in such a manner as to generate inter-symbol interference (ISI). The nature of the distortion so generated is dependent on the symbol being transmitted, and the symbols surrounding it. In some systems, the receive or measurement filter removes this ISI, producing an ISI free signal which an EVM instrument may display.

Figure 2:
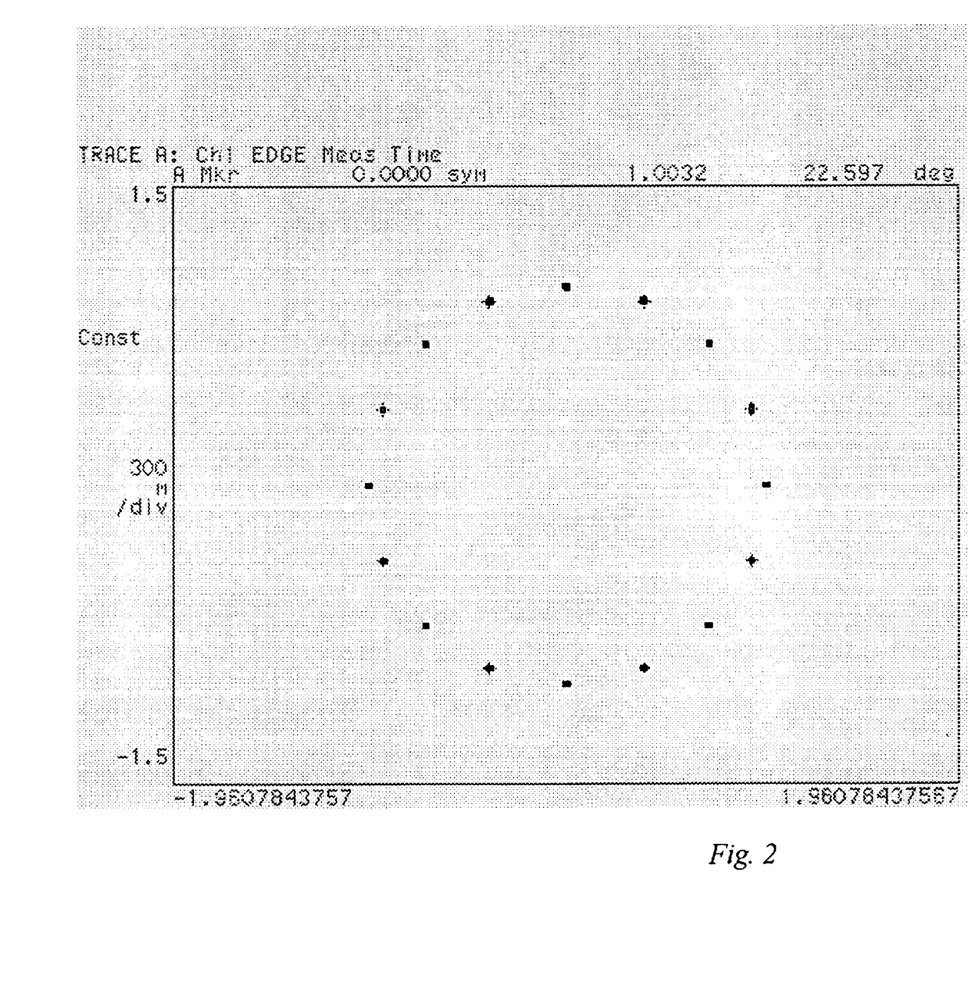
FIG. 2 shows an I-Q plot of a signal without ISI.
Figure 3:
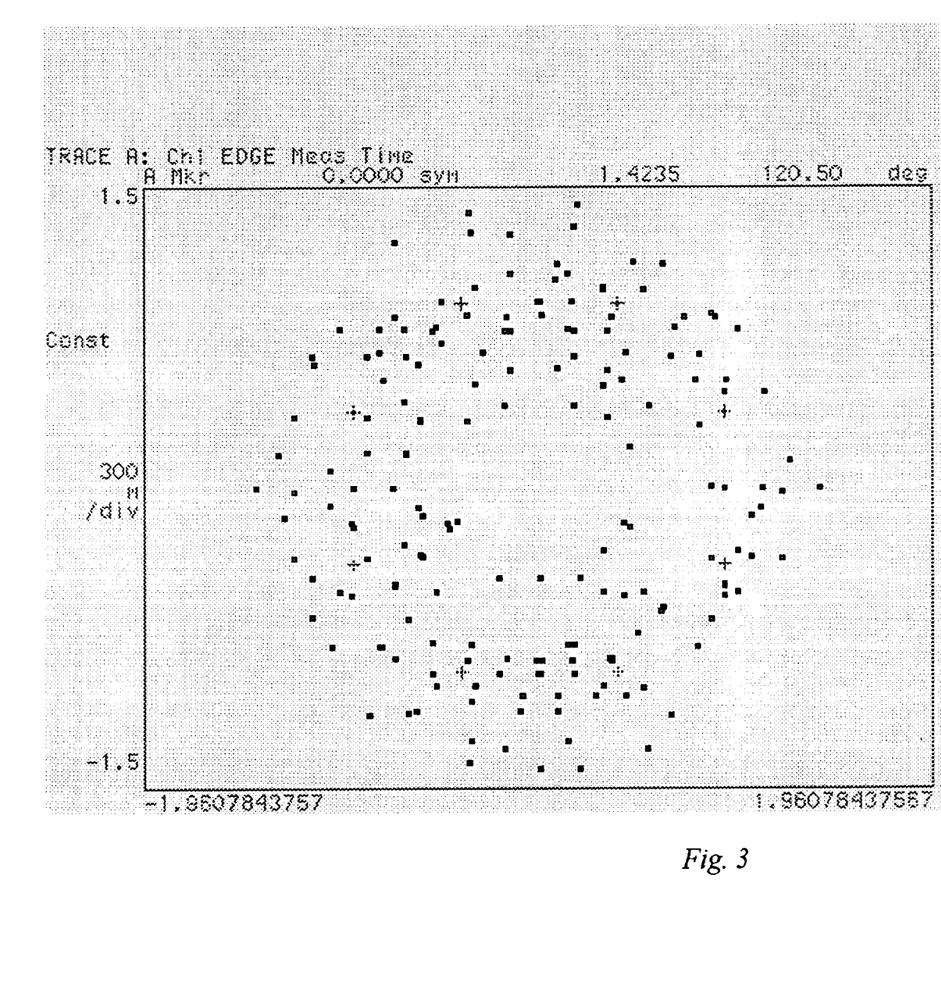
FIG. 3 shows an I-Q plot of a signal with ISI.

FIG. 2 shows a typical I-Q diagram of a 16-PSK signal without ISI. The symbols form a fairly tight constellation in the I-Q space. In systems such as GSM-EDGE, the transmit filter introduces ISI, which the measurement filter filter cannot remove—in fact, the measurement filter increases the amount of ISI present. FIG. 3 shows a 16-PSK signal with ISI present from the transmit filter.

Figure 1:
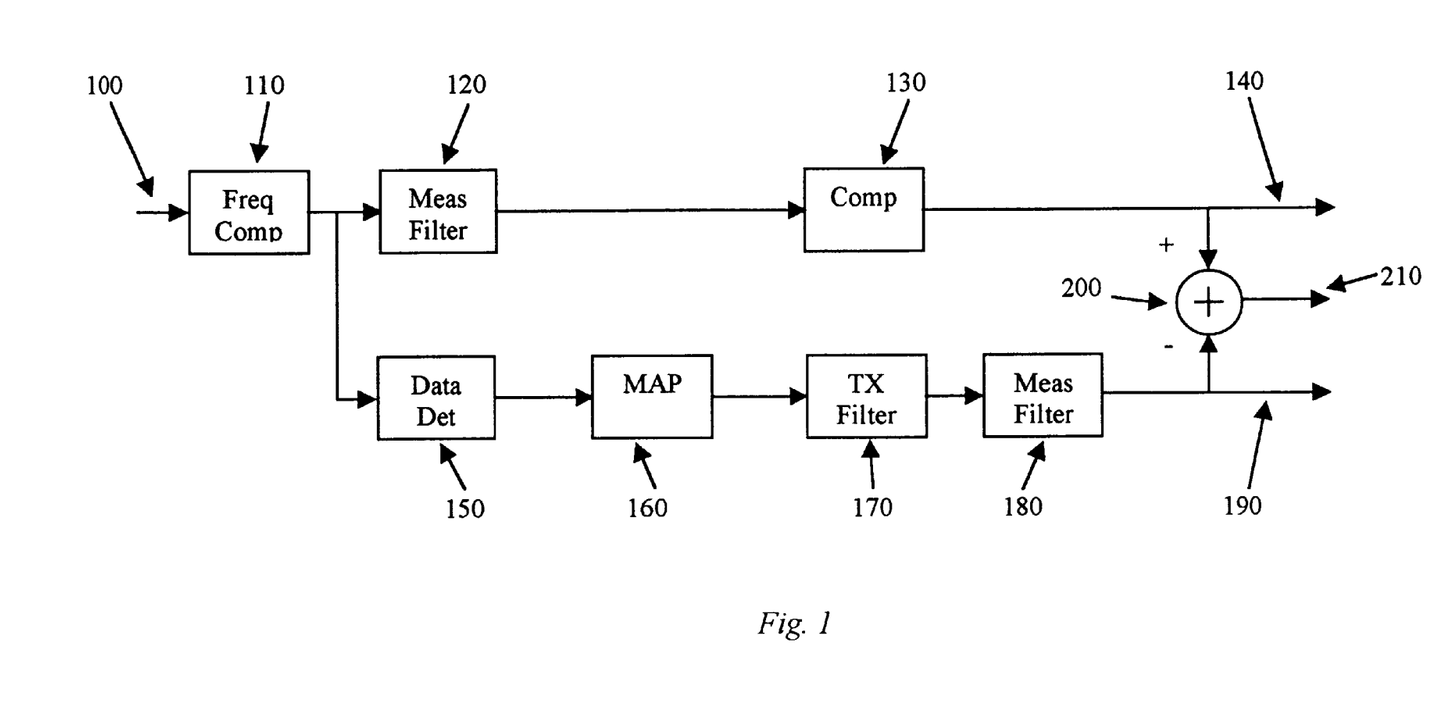

FIG. 1 shows a block diagram of an EVM instrument as known to the art. Input signal 100 passes first to frequency compensation network 110, which corrects the signal for frequency. The signal is then passed through measurement filter 120, defined by the particular standard, and then through compensator 130 to adjust phase, amplitude origin offset, and droop. The output of compensator 130 is measured signal output 140. In a second path, the signal from frequency compensator 110 is passed to data detector 150, which resolves the signal into bits. These bits are passed to symbol mapper 160, which regenerates ideal symbols from the detected bit stream. These ideal symbols are then passed through transmit filter 170 and measurement filter 180, producing signal 190, which is the ideal signal plus the ISI introduced by the transmit and measurement filters. In practice, transmit filter 170 and measurement filter 180 may be convolved to produce one filter. This filtering is commonly implemented using a digital signal processor in a manner known to the art, which produces filters with very close to ideal characteristics. Compensation network 110 and compensator 130 are designed as is known in the art to minimize the RMS error present.

Measured signal 140 may be modeled as an ISI-free signal plus any ISI, plus error. Ideal signal 190 may be modeled as the ISI-free signal plus ISI. Subtracting these two signals 200 on a sample by sample basis produces error signal 210, as (ISI-free signal plus ISI plus error) minus (ISI-free signal plus ISI) leaves error. Measured signal 140 may be sampled at one sample per symbol (the symbol rate is determined by the particular standard) and displayed to produce the I-Q plot shown as FIG. 2.

Again, in other systems, while ISI was introduced by the transmit filter, it was removed by the receive or measurement filter, so measured signal 140 is ISI free in original GSM. In GSM-EDGE, ISI introduced by the transmit filter is not removed by the measurement or receive filters, and is in fact increased. Thus, an I-Q display of measured signal 140 for a GSM-EDGE signal produces a plot similar to FIG. 3.

With ISI present, it is very difficult for the human eye to determine wither the I-Q plot of FIG. 3 represents a good signal, or contains problems.

Figure 4:
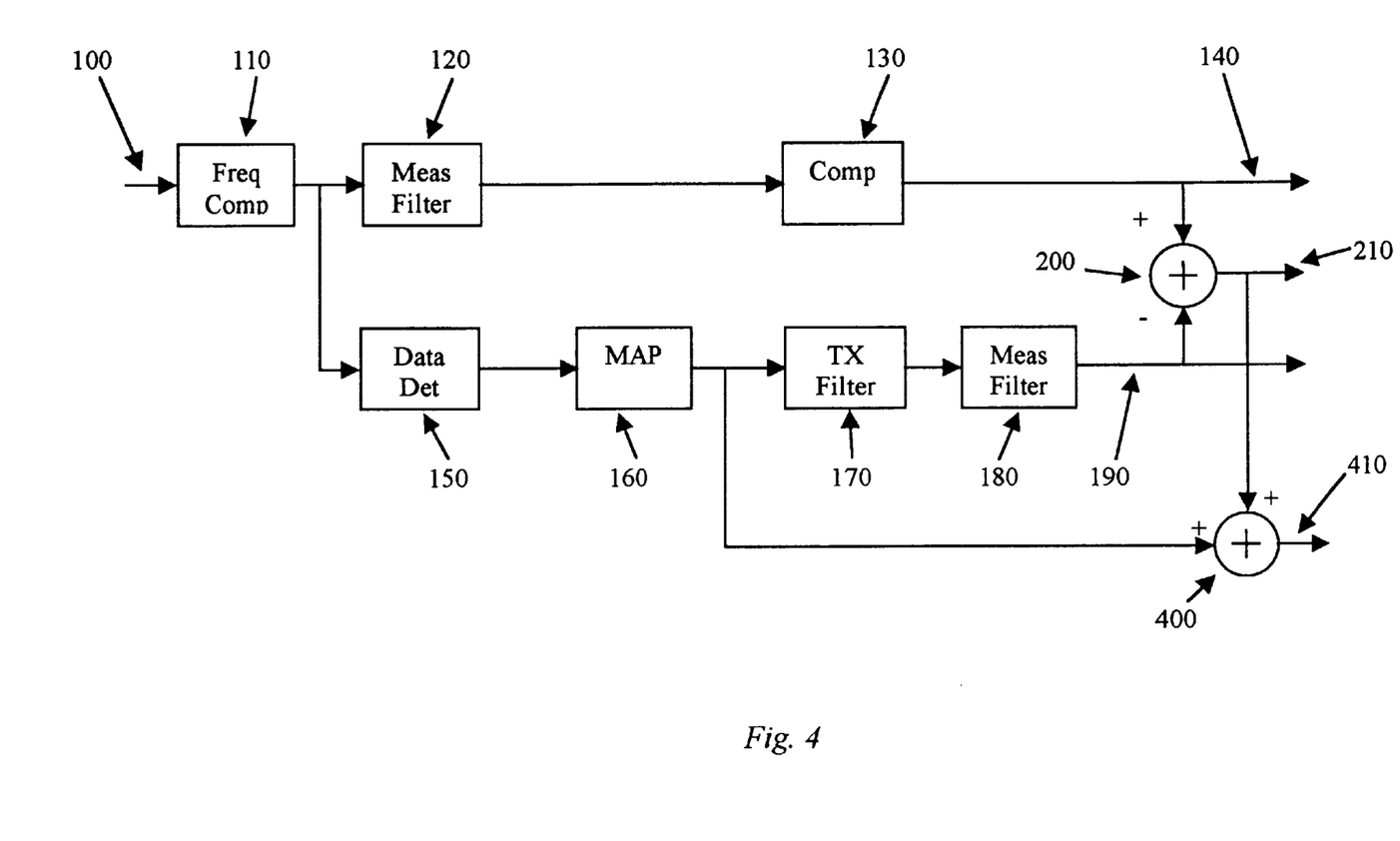
FIG. 4 shows a first embodiment of the present invention.

A first embodiment of the present invention is shown in FIG. 4. Using the same nomenclature as FIG. 1, measured signal 140 may be modeled as the ISI-free signal plus ISI plus error. Ideal signal 190 may be modeled as the ISI-free signal plus ISI. The difference 200 between these signals produces error signal 210.

Taking the ideal symbols present at the output of symbol mapper 160 and adding 400 error signal 210 produces signal 410 which is the ISI-free signal plus the error, but without ISI present. Signal 410 may be sampled at one sample per symbol to produce an ISI free I-Q display. In practice, many or all of the elements of FIG. 4 may be implemented in one or more digital signal processor chips.

Figure 5:
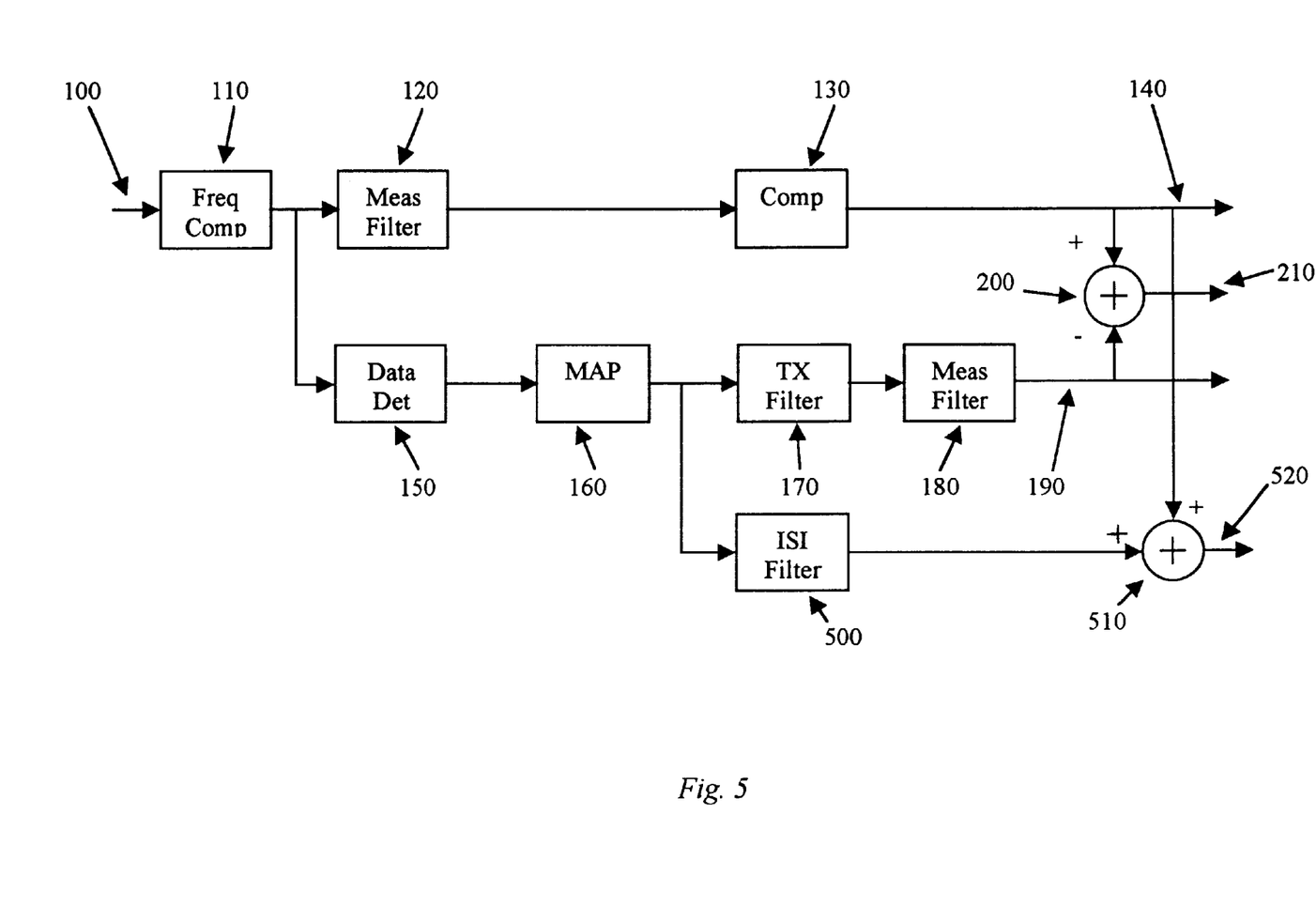
FIG. 5 shows a second embodiment of the present invention.

A second embodiment of the present invention is shown in FIG. 5. Recall that signal 140 may be modeled as the ISI-free signal plus ISI plus error. The ideal symbols without ISI is also present at the output of symbol mapper 160. These ideal symbols are passed through ISI generating filter 500, producing a signal which consists only of ISI. This filter is produced by taking the negative of the impulse response of the convolution of the transmit and measurement filters, with the center tap set to zero. Preferably implemented using a digital signal processor, ISI generating filter 500 produces a signal containing ISI, but with the center tap set to zero, without the current symbol. This ISI signal is then summed 510 with measured signal 140, producing signal 520 which may be modeled as the ISI-free signal plus ISI plus error, minus ISI, which results in the ideal signal plus the error. Signal 510 may be sampled at one sample per symbol and displayed on an I-Q plane. The elements of this embodiment of the present invention are particularly suitable for implementation using a digital signal processor.

Figure 6:
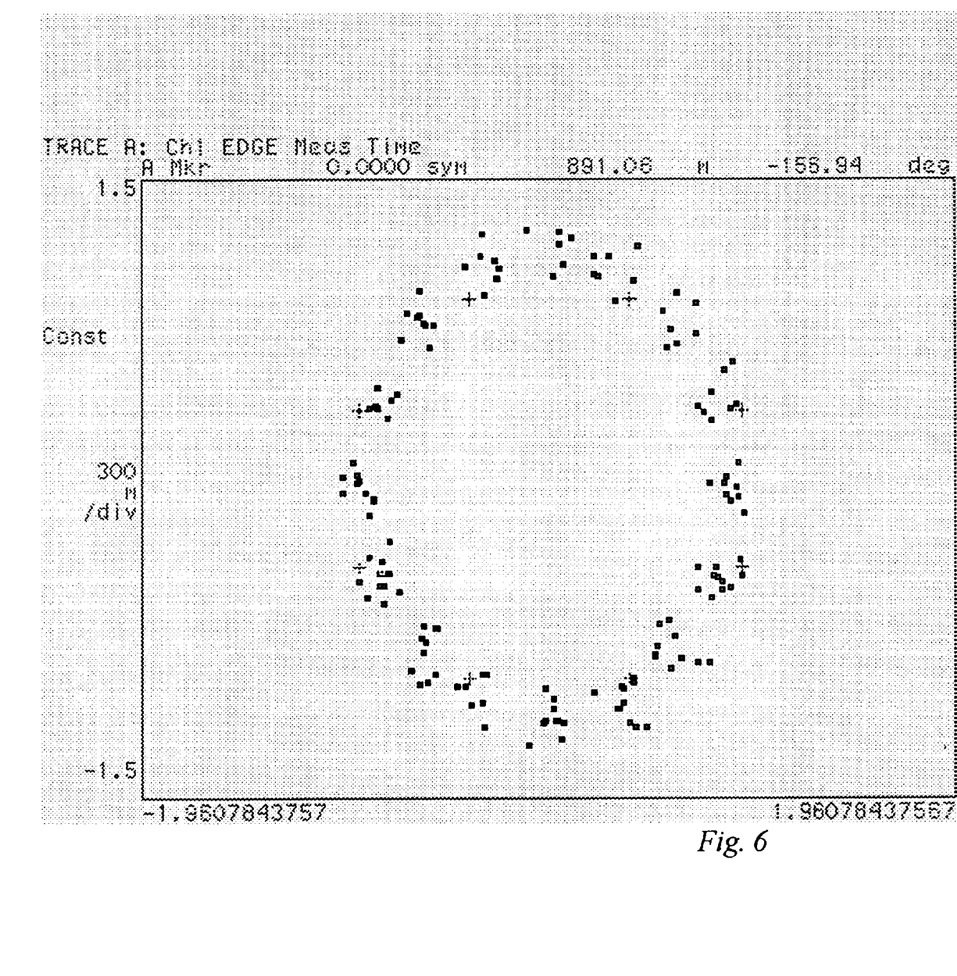
FIG. 6 shows an I-Q plot of a signal with gain imbalance.
Figure 7:
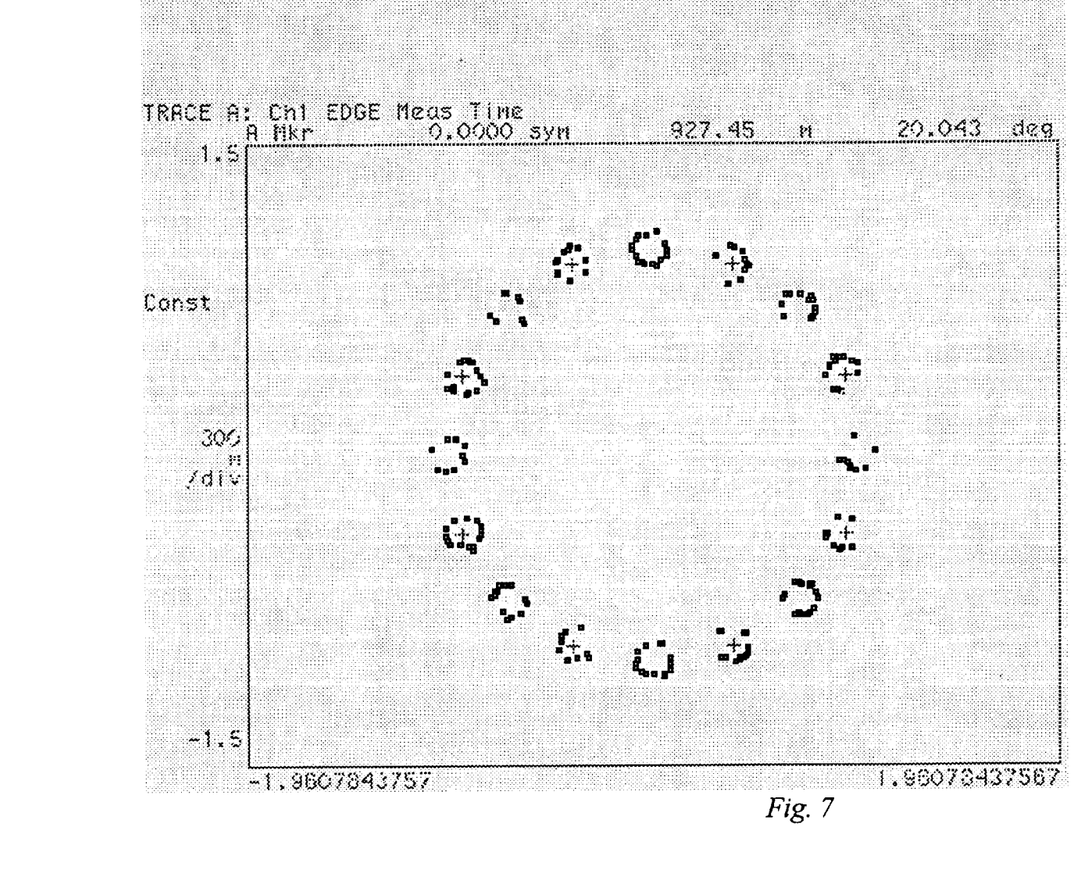
FIG. 7 shows an I-Q plot of a signal with a spurious tone.

When signals such as FIG. 3, which contains ISI that cannot be removed by passing the signal through a filter, are processed by the present invention as described and shown in FIGS. 4 and 5, displays such as FIG. 6, which shows the I-Q plot of a signal showing I-Q gain imbalance, and FIG. 7, which shows the presence of a spurious tone, result.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. In an instrument for displaying an input signal which may contain inter symbol interference, the method of producing a representation of the input signal without inter symbol interference comprising:

producing a first measured signal from the input signal, producing a second ISI-free signal from the input signal, producing a third ideal signal with inter symbol interference from the second signal, subtracting the third ideal signal with inter symbol interference from the first measured signal producing a fourth error signal, and adding the fourth error signal to the second ISI-free signal producing a representation of the input signal without inter symbol interference.

2. The method of claim 1 where the step of producing the first measured signal further comprises:

frequency compensating the input signal, filtering the compensated input signal by a measurement filter, and compensating the filtered signal to produce the first measured signal.

3. The method of claim 1 where the step of producing the second ISI-free signal comprises:

detecting a series of bits from the input signal, and mapping the detected series of bits onto a series of symbols.

4. The method of claim 1 where the step of producing the third ideal signal with inter symbol interference from the second ideal signal comprises:

filtering the second ISI-free signal by a transmit filter, and further filtering the resulting signal by a measurement filter.

5. The method of claim 1 where the step of producing the third ideal signal with inter symbol interference from the second ISI-free signal comprises filtering the second ISI-free signal with a filter which is the convolution of a transmit filter and a measurement filter.

6. In an instrument for displaying an input signal which may contain inter symbol interference, the method of producing a representation of the input signal without inter symbol interference comprising:

producing a first measured signal from the input signal, producing a second ISI-free signal from the input signal, producing a third ideal signal with inter symbol interference from the second signal, subtracting the third ideal signal with inter symbol interference from the first measured signal producing a fourth error signal, producing a fifth signal consisting of inter symbol interference from the second ideal signal, and subtracting the fifth signal consisting of inter symbol interference from the first measured signal, producing a representation of the input signal without inter symbol interference.

7. The method of claim 6 where the step of producing the first measured signal further comprises:

frequency compensating the input signal, filtering the compensated input signal by a measurement filter, and compensating the filtered signal to produce the first measured signal.

8. The method of claim 6 where the step of producing the second ISI-free signal comprises:

detecting a series of bits from the input signal, and mapping the detected series of bits onto a series of symbols.

9. The method of claim 6 where the step of producing the third ideal signal with inter symbol interference from the second ISI-free signal comprises:

filtering the second ISI-free signal by a transmit filter, and further filtering the resulting signal by a measurement filter.

10. The method of claim 6 where the step of producing the third ideal signal with inter symbol interference from the second ISI-free signal comprises filtering the second ideal signal with a filter which is the convolution of a transmit filter and a measurement filter.

11. The method of claim 6 where the step of producing the fifth signal consisting of only inter symbol interference from the second ideal signal comprises filtering the second ideal signal by a filter which is the impulse response of the convolution of the transmit and measurement filters with the center tap set to zero.

12. In an instrument for displaying an input signal which may contain inter symbol interference, apparatus for producing a representation of the input signal without inter symbol interference, comprising:

first signal processing means for producing a measured signal from the input signal, second signal processing means for producing an ISI-free signal from the input signal, third signal processing means for producing an ideal signal with inter symbol interference from the output of the second signal processing means, means for subtracting the ideal signal with inter symbol interference from the measured signal, producing an error signal, and summing means for summing the error signal with the ideal signal, producing a representation of the input signal without inter symbol interference.

13. The apparatus of claim 12 where the first signal processing means further comprises:

frequency compensation means connected to the input signal, measurement filter means connected to the frequency compensation means, and compensation means connected to the measurement filter means, producing the measured signal.

14. The apparatus of claim 12 where the second signal processing means further comprises:

data detection means for detecting a series of bits from the input signal, and symbol mapping means for mapping the series of bits from the data detection means onto an ideal series of symbols.

15. The apparatus of claim 12 where the third signal processing means further comprises:

transmit filter means for filtering the ideal signal, and measurement filter means for filtering the output of the transmit filter.

16. The apparatus of claim 12 where the third signal processing means further comprises filter means which is the convolution of the transmit filter and the measurement filter.

17. In an instrument for displaying an input signal which may contain inter symbol interference, apparatus for producing a representation of the input signal without inter symbol interference, comprising:

first signal processing means for producing a measured signal from the input signal, second signal processing means for producing an ISI-free signal from the input signal, third signal processing means for producing an ideal signal with inter symbol interference from the output of the second signal processing means, means for subtracting the ideal signal with inter symbol interference from the measured signal, producing an error signal, fourth signal processing means for producing a signal consisting of inter symbol interference from the ISI-free signal, and subtracting means for subtracting the inter symbol interference signal from the measured signal, producing a representation of the input signal without inter symbol interference.

18. The apparatus of claim 17 where the first signal processing means further comprises:

frequency compensation means connected to the input signal, measurement filter means connected to the frequency compensation means, and compensation means connected to the measurement filter means, producing the measured signal.

19. The apparatus of claim 17 where the second signal processing means further comprises:

data detection means for detecting a series of symbols from the input signal, and symbol mapping means for mapping the series of bits from the data detection means onto an ideal series of symbols.

20. The apparatus of claim 17 where the third signal processing means further comprises:

transmit filter means for filtering the ideal signal, and measurement filter means for filtering the output of the transmit filter.

21. The apparatus of claim 17 where the third signal processing means further comprises filter means which is the convolution of the transmit filter and the measurement filter.

22. The apparatus of claim 17 where the fourth signal processing means comprises filtering means which is the impulse response of the convolution of the transmit and measurement filters with the center tap set to zero.

* * * * *